Jan. 22, 1952     H. L. GLICK     2,583,143
SENSITIVITY REGULATOR FOR PHOTOMULTIPLIER TUBES
Filed Dec. 17, 1948
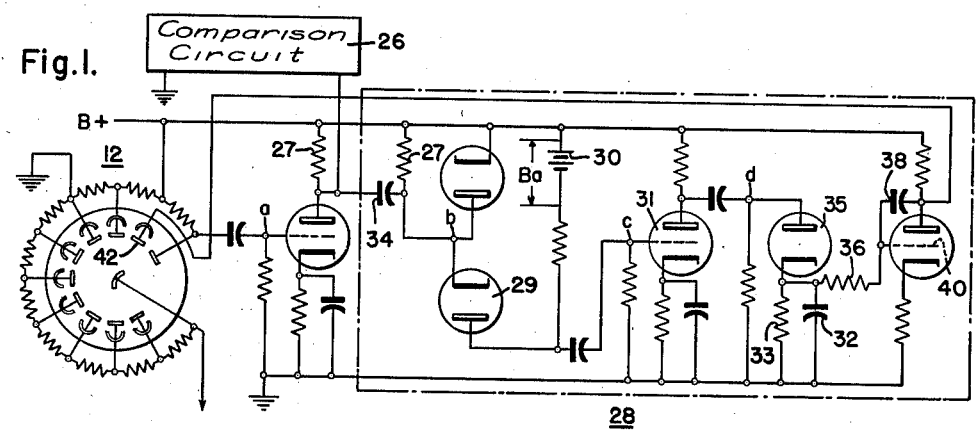
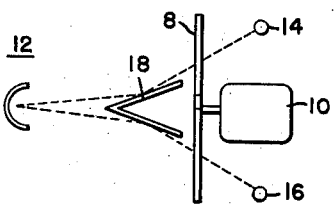
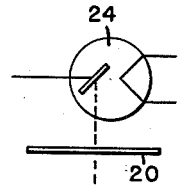
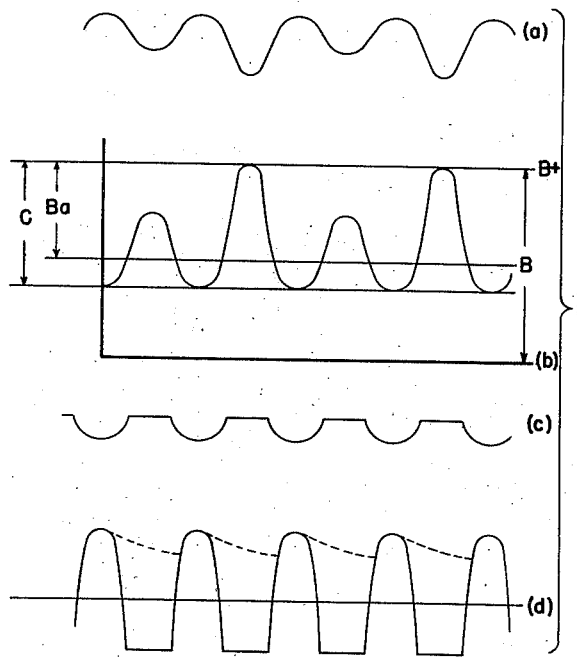
INVENTOR
HARVEY L. GLICK.
BY
ATTORNEY

Patented Jan. 22, 1952

2,583,143

UNITED STATES PATENT OFFICE 2,583,143

SENSITIVITY REGULATOR FOR PHOTO-MULTIPLIER TUBES

Harvey L. Glick, Pittsburgh, Pa., assignor to Westinghouse Electric Corporation, East Pittsburgh, Pa., a corporation of Pennsylvania Application December 17, 1948, Serial No. 65,947

6 Claims. (Cl. 250—207)

My invention relates to sensitivity regulators and more particularly to sensitivity regulators for photomultiplier tubes.

It is frequently desirable to compare the intensities of two radiation sources, one of which is known or standard and the other of which is unknown in intensity so as to evaluate the intensity of the unknown source. A similar problem arises in determining the thickness of a material. In this case a material of known thickness is placed between a known or standard source of radiation and a photomultiplier tube and the material of unknown thickness is between a known source of radiation and the photomultiplier tube. The ratio of the intensities of radiation received by the photomultiplier tube would enable one to calculate the intensity of the source of radiation in the former case, or the thickness of the unknown material in the latter case. In comparing these intensities the amplitude of the pulses they produce in a photomultiplier tube are compared in a comparison device such as a meter. It is desirable that at the comparison device the amplitude of that series of pulses, of the two series being compared, which is of greater amplitude should remain constant. By maintaining the amplitude of the pulse of greater amplitude constant at the limit of scale of the comparison apparatus, I am able to use the entire scale of the comparison apparatus at all times, and readings beyond that scale do not occur. In the prior art devices of which I am aware, the gain in power produced by the photomultiplier tube has been held constant but a satisfactory apparatus for maintaining the maximum potential constant has not been conceived.

It is accordingly an object of my invention to provide apparatus for regulating a photomultiplier tube so that it shall produce a signal of constant level for a predetermined input signal in apparatus responsive to the input signal.

Another object of my invention is to provide comparison apparatus in which the level of the larger series of a set of signals being compared shall be maintained constant.

Another object of my invention is to provide a photomultiplier circuit which shall operate to maintain the larger amplitude signals of a set of signals produced at the output of a photomultiplier at a constant level.

A more specific object of my invention is to provide a novel photomultiplier circuit.

In accordance with the present invention I provide a photomultiplier tube, the output of which is compared with a predetermined source of potential. A potential dependent on the difference in potential between the potential produced by the photomultiplier tube and the potential of the predetermined source is impressed on the last dynode of the photomultiplier in such manner that the gain in power is varied to keep the output of the photomultiplier constant. Let us assume that two signals appear at the output of the photomultiplier tube, one of which is of greater amplitude than the other. Both signals are compared with a predetermined source of potential, and a resultant potential dependent on the amplitude of the larger of the two signals is produced. This potential is impressed on the last dynode of the photomultiplier in such a sense as to decrease the amplitude of the signal. The amplitude is thus reduced to the desired constant level. If the maximum signal is lower than the predetermined potential the counteracting potential is not impressed and the constant level is reached by this latter signal.

The novel features that I consider characteristic of my invention are set forth with particularity in the appended claims. The invention itself, however, both as to its organization and its method of operation together with additional objects and advantages thereof will best be read in connection with the accompanying drawing, in which:

Figure 1 is a schematic drawing showing an embodiment of my invention;

Fig. 2 is a schematic drawing showing apparatus for comparing the intensities of two sources of radiation in accordance with my invention;

Fig. 3 is a view in front elevation of a disc used in the system shown in Fig. 2;

Fig. 4 is a graph representing the potential as a function of time at different points in the apparatus shown in Fig. 1; and Fig. 5 is a schematic drawing of apparatus for comparing the thickness of a material of known thickness with the thickness of a material of unknown thickness, in accordance with a modification of my invention.

Referring in detail to the drawing, a disc 8 opaque to the radiation to be compared and with one sector cut away is rotated by a motor 10. A photomultiplier 12 is placed a short distance from and substantially perpendicular to and on the axis of the disc 8. On the opposite side of the disc from the photomultiplier tube 12 are placed a standard radiation source 14 of known intensity and an unknown radiation source 16 of unknown intensity. These two sources are so positioned that radiation from them striking the photomultiplier tube 12 must pass through the open sector of the opaque disc 8, and also so positioned that radiation from only one of said radiation sources will pass through the open sector and impinge on the cathode of the photomultiplier tube 12 at any particular time. Mirrors 18 may be employed as shown in Fig. 2 to aid in achieving this result. As the disc 8 rotates, it will allow the radiation first from one source and then from the other source to impinge on the photomultiplier tube. Since a large portion of the disc is cut away, the intensity curve of radiation striking the cathode of the photomultiplier tube will resemble a sine wave. However, since the succeeding peaks of the wave are caused by different sources and since these two sources are likely to be of different intensity, the amplitude of any two succeeding peaks will probably be different in magnitude.

In Fig. 5 is shown an arrangement of apparatus for comparing the thickness of a material of unknown thickness 20 with that of a material of known thickness 22 by passing X-rays from two sources 24 of equal intensity through the aforementioned materials 20, 22 before activating the photomultiplier tube 12. The two sources 24 of X-rays are coordinated so that they alternate, only one of the sources producing X-rays at any instant. On impinging on the cathode of the photomultiplier tube 12, the radiation from the two sources will cause a current to flow in the photomultiplier tube. The potential leaving the photomultiplier tube and entering the first amplifier at (a) in Fig. 1 is shown in Fig. 4(a).

In the preferred embodiment of my invention, the potentials produced by the photomultiplier tube are amplified and then impressed on a comparison circuit 26 shown in Fig. 1. The potentials produced by the photomultiplier tube and amplified are also impressed on a regulator circuit 28. The signals entering the regulation circuit are subjected to a biasing control comprising a condenser 34 connected on both sides to the positive terminal of the main power supply through resistances 27, and a diode connected in parallel with one of the resistances. The biasing control maintains the maximum amplitude of the potential of the larger of the two pulses in the signal at a constant level. The potential curve for the potential leaving the biasing control at (b) in Fig. 1 is shown in Fig. 4(b). It will be observed that succeeding waves are shown of different amplitudes. This is because succeeding waves will be from different sources which are causing radiation of different intensity to impinge on the cathode of the photomultiplier tube. The potential leaving the biasing control circuit is passed through a diode 29 and compared with a battery 30 or other known or predetermined source of potential so that only the difference in potential between that coming from the photomultiplier tube 12 and that produced by the known source of potential 30 is allowed to pass into the latter stages of the circuit.

Fig. 4(c) shows a curve of potential plotted against time of the potential from the photomultiplier tube after having been compared with the predetermined source of potential 30. In accordance with one embodiment of my invention, this difference in potential is caused to activate the second amplifier 31, the output of which, shown by the solid lines of Fig. 4(d), is impressed on a rectifier 35 which causes condenser 32 to charge up to the positive peak of the amplified signal. The condenser discharges slowly through resistor 33 thus maintaining essentially a positive potential on the grid of the output amplifier 40. The condenser 32 thus tends to smooth out the form of the wave into a saw-tooth curve as shown by the dotted line in Fig. 4(d). The output from the condenser 32 is acted on by an anti-hunting circuit comprising a resistance 36 and a condenser 38 and applied to the output amplifier 40. The output from the output amplifier is applied in one embodiment of my invention to the last dynode 42 of the photomultiplier tube 12 while in other embodiments it may be applied to another dynode or to a plurality of dynodes.

To recapitulate if the peak-to-peak voltage output of the first rectifier 29 is greater than the predetermined potential 30, the difference will cause the voltage on the last dynode 42 to decrease. This decreases the photomultiplier sensitivity and decreases the peak-to-peak voltage leaving the first amplifier 31. On the other hand, if the peak-to-peak potential leaving the first rectifier 29 is less than the predetermined potential source 30, no signal will appear on the grid of the second amplifier 31 and the potential on the last dynode 42 will increase, thereby increasing the sensitivity of the phototube and increasing the output potential of the first amplifier 31. Thus the phototube sensitivity is automatically adjusted so that the peak-to-peak potential leaving the first amplifier is very slightly greater than the potential of the predetermined source of potential.

It should be noted that the last dynode can be either positive or negative with respect to the preceding dynode, thus allowing a large range of adjustment.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In combination, a photomultiplier tube, connections for deriving a predetermined standard potential, comparing means adapted to compare the output potentials of said photomultiplier with said standard potential across said connections, means capable of applying the difference between the maximum potential produced by said photomultiplier and the potential across said connections to a dynode of said photomultiplier so as to vary the gain of said photomultiplier.

2. A sensitivity regulator for a photomultiplier tube comprising connections for deriving a predetermined standard potential, comparing means adapted to compare the output potentials of said photomultiplier tube with said predetermined standard and potential so that substantially only the difference in potential between the maximum potential produced by said photomultiplier and the potential of said predetermined standard is allowed to pass, means for applying the output of said comparing means to a dynode of said photomultiplier tube.

3. A sensitivity regulator for a photomultiplier tube comprising a predetermined standard of substantially D. C. potential, comparing means adapted to compare the output potentials of said photomultiplier tube with said predetermined source so that substantially only the difference in potential between the maximum potential produced by said photomultiplier and the potential of said predetermined standard is allowed to pass.

means for applying the output of said comparing means to a dynode of said photomultiplier tube.

4. In combination, a photomultiplier tube, means for maintaining the maximum potential produced by said photomultiplier at a constant level, comparing means adapted to compare the potential of the signals from said photomultiplier tube with a predetermined standard of potential and to allow substantially only the difference in potential between the maximum potential of said signals and the potential of said predetermined standard to be passed on, means for applying said difference in potential to said photomultiplier so that said difference in potential will cause the gain of said photomultiplier tube to change in response thereto.

5. In combination, a photomultiplier, connections adapted to apply a predetermined standard of potential, means adapted to apply the difference between the maximum potential produced by said photomultiplier and the potential across said connections to a dynode of said photomultiplier so as to vary the gain of said photomultiplier.

6. A sensitivity regulator for a photomultiplier tube comprising connections adapted to apply a predetermined source of potential and an amplifier, connections between said amplifier, said photomultiplier tube and said first mentioned connections as to cause said amplifier to be responsive to the difference between the potential produced by said photomultiplier and the potential supplied through said connections, connections between said amplifier and said photomultiplier adapted to impress the output potential of said amplifier on said photomultiplier.

HARVEY L. GLICK.

REFERENCES CITED

The following references are of record in the file of this patent:

UNITED STATES PATENTS

| Number | Name | Date |
| --- | --- | --- |
| 2,290,775 | Snyder | July 21, 1942 |
| 2,412,423 | Rajchman et al. | Dec. 10, 1946 |
| 2,454,169 | Haynes | Nov. 16, 1948 |
| 2,512,355 | Marshall et al. | June 20, 1950 |